US011962969B2

(12) United States Patent
Liu et al.

(10) Patent No.: US 11,962,969 B2

(45) **Date of Patent: *Apr. 16, 2024**

(54) ACOUSTIC DEVICE AND ELECTRONIC APPARATUS

(71) Applicant: GOERTEK INC., Shandong (CN)

(72) Inventors: Chunfa Liu, Shandong (CN); Tongyan Xu, Shandong (CN); Chengfei Zhang, Shandong (CN)

(73) Assignee: GOERTEK INC., Weifang (CN)

( * ) Notice: Subject to any disclaimer, the term of this patent is extended or adjusted under 35 U.S.C. 154(b) by 348 days.

This patent is subject to a terminal disclaimer.

(21) Appl. No.: 17/415,315

(22) PCT Filed: Dec. 17, 2019

(86) PCT No.: PCT/CN2019/125916

§ 371 (c)(1),
(2) Date: Jun. 17, 2021

(87) PCT Pub. No.: WO2020/125619

PCT Pub. Date: Jun. 25, 2020

(65) Prior Publication Data

US 2022/0070577 A1 Mar. 3, 2022

(30) Foreign Application Priority Data

Dec. 17, 2018 (CN) ......................... 201811544631.4
May 30, 2019 (CN) ......................... 201910464178.4

(51) Int. Cl.

*H04R 7/04* (2006.01)
*H04R 1/28* (2006.01)
*H04R 9/06* (2006.01)

(52) U.S. Cl.

CPC ............. *H04R 1/2842* (2013.01); *H04R 7/04* (2013.01); *H04R 9/06* (2013.01); *H04R 2499/11* (2013.01)

(58) Field of Classification Search

CPC .......... H04R 9/06; H04R 7/04; H04R 1/2842; H04R 2499/15; H04R 2499/11; H04R 1/2834; H04R 7/20; H04R 1/288

(Continued)

(56) References Cited

U.S. PATENT DOCUMENTS 3,727,719 A * 4/1973 Yando .................. H04R 1/2834 381/345
8,073,177 B2 * 12/2011 Tsai ..................... H04R 1/2834 381/345

(Continued)

FOREIGN PATENT DOCUMENTS

CN 206274682 U 6/2017
CN 107318073 A 11/2017

(Continued)

OTHER PUBLICATIONS

International Search Report from International Application No. PCT/CN2019/125916 dated Mar. 19, 2020.

*Primary Examiner* — Disler Paul
(74) *Attorney, Agent, or Firm* — Shih IP Law Group, PLLC

(57) ABSTRACT

An acoustic device comprises a sound generating unit having a vibration diaphragm, the acoustic device is provided with a sound outlet, the sound waves at a front side of the vibration diaphragm radiates to the outside through the sound outlet; and an enclosed closed cavity formed at a rear side of the vibration diaphragm, the closed cavity is divided into first and second closed cavities by a partition part, and at least a portion of the partition part flexibly deforms, the first closed cavity is adjacent to the vibration diaphragm, the second closed cavity is far away from the vibration diaphragm, the volume of the second closed cavity is larger than that of the first closed cavity; the second closed cavity encloses the sound waves into the second closed cavity; at (Continued)

least a part of an electronic apparatus housing is used for forming the first and/or the second closed cavity.

12 Claims, 6 Drawing Sheets

(58) Field of Classification Search
USPC .................................................. 381/115, 117
See application file for complete search history.

(56) References Cited

U.S. PATENT DOCUMENTS

| | | | | |
|---|---|---|---|---|
| 8,093,177 | B2 * | 1/2012 | Hamers | C07F 3/06 136/206 |
| 10,771,892 | B1 * | 9/2020 | Morozov | H04R 9/022 |
| 10,911,875 | B2 * | 2/2021 | Wiik | H04R 9/046 |
| 10,924,828 | B2 * | 2/2021 | Wu | H04R 1/023 |
| 11,516,588 | B2 * | 11/2022 | Wang | H04R 9/06 |
| 2007/0092096 | A1 | 4/2007 | Litovsky | |

FOREIGN PATENT DOCUMENTS

| | | | |
|---|---|---|---|
| CN | 107371107 | A | 11/2017 |
| CN | 207124749 | U | 3/2018 |
| CN | 207304902 | U | 5/2018 |
| CN | 108462929 | A | 8/2018 |
| CN | 208112944 | U | 11/2018 |
| WO | 2008064294 | A2 | 5/2008 |
| WO | 2019019323 | A1 | 1/2019 |
| WO | 2019019325 | A1 | 1/2019 |
| WO | 2019218667 | A1 | 11/2019 |

* cited by examiner

ACOUSTIC DEVICE AND ELECTRONIC APPARATUS

TECHNICAL FIELD

The present disclosure relates to the technical field of acoustics, and more particularly, to an acoustic device and an electronic apparatus in which the acoustic device is mounted.

BACKGROUND ART

In general, an acoustic system with a traditional structure (Prior Art 1) includes a closed box and a sound generating unit disposed on the closed box, and a cavity is formed between the closed box and the sound generating unit. Due to the volume limitation of the cavity in the acoustic system, it is difficult for the acoustic systems, especially the miniature acoustic system, to achieve the effect of reproducing the bass satisfactorily. Conventionally, in order to achieve satisfactory bass reproduction in an acoustic system, two ways are usually used: one way is to provide sound absorption materials (such as activated carbon, zeolite, etc.) in the box of the acoustic system to absorb or desorb the gas in the box, so as to increase the volume and therefore reduce the low frequency resonance frequency; the another way is to provide a passive radiator on the box of the acoustic system (Prior Art 2), for example, as shown in FIG. 1, wherein a reference numeral 10 is a sound generating unit, a reference numeral 20 is the box of the acoustic system, and a reference numeral 30 is a passive radiator, and the sound generating unit and the passive radiator radiate sound to the outside simultaneously, so that the sound waves of the sound generating unit and the passive radiator are communicated and superimposed to enhance the local sensitivity near a specific frequency point fp (resonance frequency point) by utilizing the principle that the passive radiator and the box form a strong resonance at the resonance frequency point fp (for example, see patent CN1939086A). However, there are some defects in the two ways mentioned above. The first way of adding sound absorption materials into the box needs to achieve a good sealing package of sound absorption materials, otherwise, if the sound absorption materials enter into the loudspeaker unit, the acoustic performance of the loudspeaker unit will be damaged, and the service life of the loudspeaker unit will be affected. In the second way employing the passive radiator, the passive radiator radiates strongly and the sound generating unit almost stops near the resonance frequency point fp, so that the local sensitivity of the acoustic system can be enhanced in the frequency band near fp through the high sensitivity design of the passive radiator; however, in the frequency band below fp, the phases of the sound waves of the passive radiator and the sound generating unit are opposite to each other, and the sound waves counteract each other, therefore, the passive radiator has a negative effect on the sensitivity of the acoustic system. In a word, the passive radiator can only improve the sensitivity in the frequency band near the resonance point, but it cannot improve the sensitivity in all low frequency bands. As shown in FIG. 2, FIG. 2 illustrates the test curves (SPL curves) of loudness at different frequencies for prior art 2 and prior art 1. Therefore, it is necessary to further improve the defects of the prior arts.

SUMMARY OF THE INVENTION

An object of the present invention is to provide an acoustic device which can effectively reduce the resonance frequency and significantly improve the sensitivity in the low frequency bands of the product as a whole.

In order to solve the above technical problem, the technical solution provided by the present invention is an acoustic device comprising:

- a sound generating unit comprising a vibration diaphragm, wherein the acoustic device is provided with a sound outlet, and the sound waves at a front side of the vibration diaphragm is radiated to the outside through the sound outlet; and
- an enclosed closed cavity formed at a rear side of the vibration diaphragm, wherein the closed cavity is divided into a first closed cavity and a second closed cavity by a partition part, and at least a portion of the partition part may be flexibly deformed, and the first closed cavity is adjacent to the vibration diaphragm, and the second closed cavity is far away from the vibration diaphragm, and the volume of the second closed cavity is larger than the volume of the first closed cavity;
- when the vibration diaphragm vibrates, the internal sound pressure of the first closed cavity is changed, and a flexible deformation part of the partition part deforms with the change of the sound pressure in the first closed cavity, so as to flexibly adjust the volume of the first closed cavity; and the second closed cavity encloses the sound waves generated by the flexible deformation part during deformation into the second closed cavity; and
- at least a part of an electronic apparatus housing for mounting the acoustic device is used for forming the first closed cavity and/or the second closed cavity.

Preferably, bodies of the first closed cavity and the second closed cavity extend in a horizontal direction perpendicular to a thickness direction of the acoustic device.

Preferably, the sound generating unit and the first closed cavity are provided in plural by one-to-one correspondence, the second closed cavity is provided with one, and the partition part between each of the first closed cavities and the second closed cavity is provided with the flexible deformation portion.

Preferably, the sound generating unit is provided with one or more, the first closed cavity is provided with one, and the second closed cavity is provided with one or more.

Preferably, the vibration direction of the vibrating diaphragm of the sound generating unit is parallel to the thickness direction of the acoustic device.

Preferably, the acoustic device includes a first housing, on which the sound generating unit is mounted to form a sound generating assembly, the first closed cavity is formed between the vibrating diaphragm of the sound generating unit and the first housing; the acoustic device includes a second housing, and the sound generating assembly is mounted in the second housing, and the second closed cavity is formed between the second housing and the first housing, and the sound generating assembly is disposed inside the second closed cavity; a part of the first housing forms the partition part; the second housing is the electronic apparatus housing.

Preferably, the second housing has a top wall, a bottom wall, and a side wall connecting the top wall and the bottom wall, and the sound outlet is provided on the top wall, the bottom wall, or the side wall.

Preferably, the acoustic device is provided with a sound channel corresponding to the sound outlet, the sound waves at the front side of the vibrating diaphragm is radiated to the sound outlet through the sound channel, wherein:

the sound generating unit is mounted in the first housing, and the sound channel is disposed on the first housing; or the sound channel is disposed on the second housing, and the sound generating assembly is opposed to and coupled with the sound channel; or the sound channel is separately provided, and the sound channel is respectively opposed to and coupled with the sound outlet and the sound generating assembly.

Preferably, the flexible deformation portion is an independent component, and the flexible deformation portion is fixedly connected with other parts of the first housing by means of bonding, welding or hot melting; or the flexible deformation portion is integrally coupled with other parts of the first housing.

Preferably, the sound generating unit is a micro sound generating unit.

Another object of the present invention is to provide an electronic apparatus including the above-mentioned acoustic device that can effectively reduce the resonance frequency and greatly improve the low frequency sensitivity of the product as a whole.

In order to solve the above technical problems, the present invention provides an electronic apparatus, which comprises the above-mentioned acoustic device.

Preferably, the electronic apparatus includes an electronic apparatus housing, and at least a part of the electronic apparatus housing is used to form the first closed cavity and/or the second closed cavity.

Preferably, the acoustic device includes a first housing, on which the sound generating unit is mounted to form a sound generating assembly, and the first closed cavity is formed between the vibrating diaphragm of the sound generating unit and the first housing; the acoustic device further includes a second housing, the sound generating assembly is mounted in the second housing, the second closed cavity is formed between the second housing and the first housing; a part of the first housing forms the partition part; the second housing is the electronic apparatus housing.

According to the technical solution provided by the present invention, in the acoustic device, the closed cavity at the rear side of the vibrating diaphragm is divided into the first closed cavity and the second closed cavity by the partition part, and the flexible deformation portion is provided on the partition part, and by providing the flexible deformation portion, the flexible deformation portion deforms the change of the sound pressure, and the volume of the first closed cavity is adjustable, thereby increasing the equivalent acoustic compliance of the first closed cavity, effectively reducing the resonance frequency of the acoustic device, and improving the low frequency sensitivity; and through the isolation design of the sound generating unit and the flexible deformation portion, the sound waves radiated by the flexible deformation portion is enclosed in the acoustic device to avoid the sound waves with anti-phase radiated by the flexible deformation part to counteract the positive sound waves radiated by the sound generating unit, thus greatly improving the sensitivity in the low frequency bands of the product as a whole.

Other features and advantages of the present invention will become more apparent by the following detailed description of exemplary embodiments of the present invention with reference to the accompanying drawings.

BRIEF DESCRIPTION OF THE DRAWINGS

The accompanying drawings which are incorporated in and constitute a part of the specification illustrate the embodiments of the present invention, and are used to explain the principles of the present invention together with the description thereof.

REFERENCE NUMERALS

Figure 1:
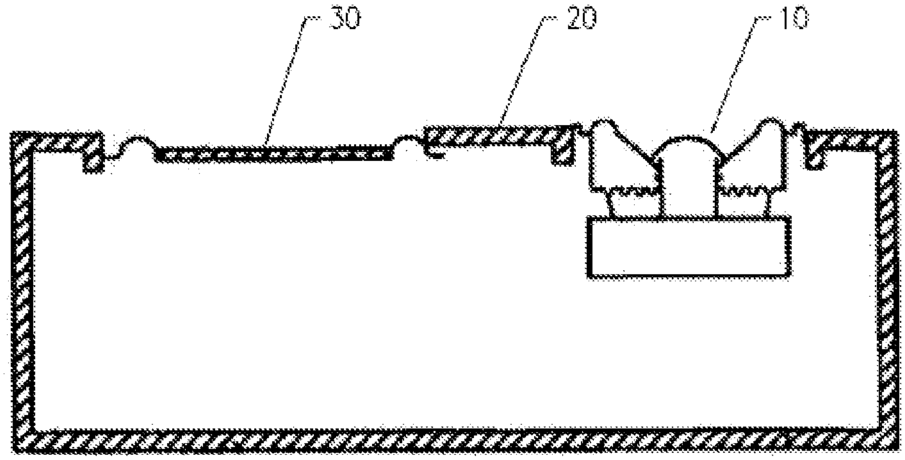
FIG. 1 is a structural schematic diagram of the acoustic device provided with the passive radiator in the prior art 2.

1: sound generating unit; 11: vibration diaphragm; 2: first housing; 21: first closed cavity; 22: flexible deformation part; 23: pressure equalizing hole; 3: second housing; 31: second closed cavity; 4: sound outlet; 5: electronic apparatus.

DETAILED DESCRIPTION OF THE EMBODIMENTS

Various exemplary embodiments of the present invention will now be described in detail with reference to the accompanying drawings. It should be noted that the relative arrangements, numerical expressions and numerical values of the components and steps set forth in these embodiments do not limit the scope of the present invention unless otherwise specified.

The following description of at least one exemplary embodiment is in fact only illustrative and is in no way taken as any limitation on the present invention and the application or use thereof.

Techniques, methods and apparatus known to those skilled in the art may not be discussed in detail, but in appropriate cases, the techniques, methods and apparatus shall be considered as a part of the specification.

In all of the examples shown and discussed here, any specific value should be interpreted as merely illustrative and not as a limitation. Therefore, other examples of the exemplary embodiments may have different values.

It should be noted that similar reference numerals and letters denote similar items in the following drawings. Therefore, once an item is defined in one drawing, it does not need to be further discussed in subsequent drawings.

Embodiment 1

Figure 3:
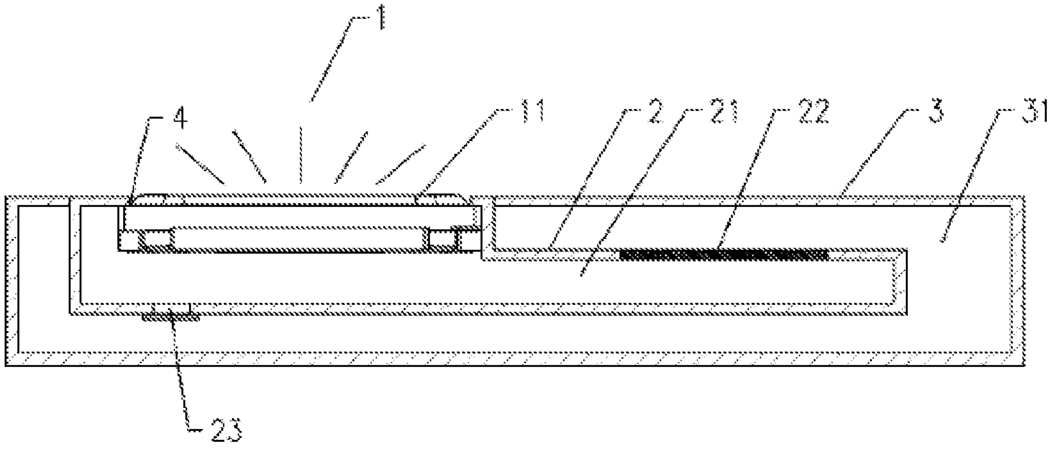
FIG. 3 is a structural schematic diagram of an acoustic device according to an embodiment of the present invention.

As shown in FIG. 3, an acoustic device comprises a sound generating unit 1. In this embodiment, the sound generating unit 1 is a micro sound generating unit, and more specifically, the sound generating unit 1 is a micro moving coil loudspeaker. The sound generating unit 1 generally comprises a housing, and a vibration system and a magnetic circuit system which are accommodated and fixed in the housing. The vibration system comprises a vibration diaphragm 11 fixed on the housing and a voice coil coupled on the vibration diaphragm 11. The magnetic circuit system is provided with a magnetic gap, and the voice coil is provided in the magnetic gap. The voice coil reciprocates up and down in the magnetic field after the alternating current is applied to the voice coil, and thus driving the vibration diaphragm 11 to vibrate and generate sound.

The acoustic device is provided with a sound outlet 4, the sound waves at the front side of the vibration diaphragm 11 is radiated to the outside through the sound outlet 4, and the sound waves at the rear side of the vibration diaphragm 11 is retained in the acoustic device. A cavity is formed between the vibration diaphragm 11 and the housing and the magnetic circuit system. Generally, a rear sound hole is provided on the housing or the magnetic circuit system or provided between the housing and the magnetic circuit system, and the sound waves at the rear side of the vibration diaphragm 11 may enter into the interior of the acoustic device through the rear sound hole. In this embodiment, the vibration direction of the vibration diaphragm 11 of the sound generating unit 1 is parallel to the thickness direction of the acoustic device, which is benefit to the thin design of the acoustic device.

Furthermore, in this embodiment, a closed cavity is formed at the rear side of the vibration diaphragm 11, and the closed cavity is divided into a first closed cavity 21 and a second closed cavity 31 by a partition part, wherein at least a portion of the partition part may flexibly deforms, and the portion that may flexibly deforms is a flexible deformation part 22, and the first closed cavity 21 is adjacent to the vibration diaphragm 11, and the second closed cavity 31 is far away from the vibration diaphragm 11. Further, in the present embodiment, the volume of the second closed cavity 31 is larger than the volume of the first closed cavity 21.

When the vibration diaphragm 11 vibrates, the internal sound pressure of the first closed cavity 21 is changed, and the flexible deformation part 22 of the partition part deforms with the change of the sound pressure in the first closed cavity 21, so as to flexibly adjust the volume of the first closed cavity 21; and the second closed cavity 31 encloses the sound waves generated by the flexible deformation part 22 during deformation into the second closed cavity 31.

In the present embodiment, at least a part of the housing of an electronic apparatus for mounting the acoustic device is used for forming the first closed cavity 21 and/or the second closed cavity 31. Wherein, the electronic apparatus 5 may be a mobile phone, a tablet computer, a notebook computer, and the like. That is, a portion of the wall or the entire wall of the first closed cavity 21 is constituted by the electronic apparatus housing, or a portion of the wall or the entire wall of the second closed cavity 31 is composed of the electronic apparatus housing, or a portion of the walls or all of the walls of the first closed cavity 21 and the second closed cavity 31 is composed of the electronic apparatus housing. In the present invention, the electronic apparatus housing is also used as the cavity wall of the first closed cavity (and the second closed cavity), which can make full use of the internal space of the electronic apparatus, and meanwhile save a part of the space occupied by the wall of the cavity, which is more benefit to the thin design of the electronic apparatus.

It should be noted that the term "closed" described in this embodiment and the present invention may be a fully closed state or a relatively closed state in a physical structure. For example, the first closed cavity may comprise a pressure equalizing hole 23 which provided to balance the internal and external air pressures and does not have significant influence on the rapid change of the sound pressure based on the product usage requirements, or other opening structures, and this first closed cavity is also regarded as a closed cavity. For another example, the second closed cavity may comprise a gap and the like generated when coupled with the first closed cavity, and a gap and the like of its own structure, and since they can effectively isolate the sound waves generated by the flexible deformation part, and have no obvious influence on the sound waves generated by the sound generating unit, this second closed cavity is also regarded as a closed cavity. In general, the total area of the above openings or gaps does not exceed 20 $mm^2$.

As a specific embodiment, the acoustic device comprises a first housing 2, and the sound generating unit 1 is mounted on the first housing 2 to form a sound generating assembly, and the first closed cavity 21 is formed between the vibration diaphragm 11 of the sound generating unit 1 and the first housing 2; the acoustic device comprises a second housing 3, and the sound generating assembly is mounted in the second housing 3, and the second closed cavity 31 is formed between the second housing 3 and the first housing 1; a portion of the first housing 2 forms the partition part. In the case where there are other components in the second housing 3, the second closed cavity 31 is actually constituted by the gaps between the components and the second housing 3 and the first housing 2.

In this embodiment, the sound generating unit 1 is provided in the interior of the first housing 2, and the sound generating unit 1 and the first housing 2 are formed as an integral structure, and then the integral structure is assembled with the second housing 3. The first housing 2 is provided with an opening, and the space at the front side of the vibration diaphragm is in communication with the opening, and the sound is radiated to the sound outlet 4 of the acoustic device through the opening.

Figure 11:
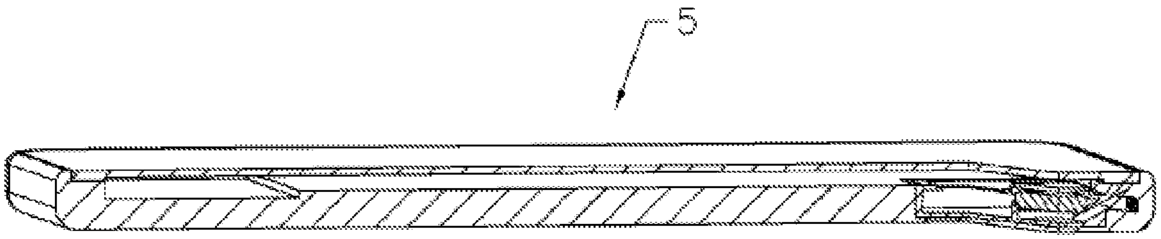
FIG. 11 is a structural schematic diagram of an electronic apparatus using an acoustic device according to the present invention.
Figure 12:
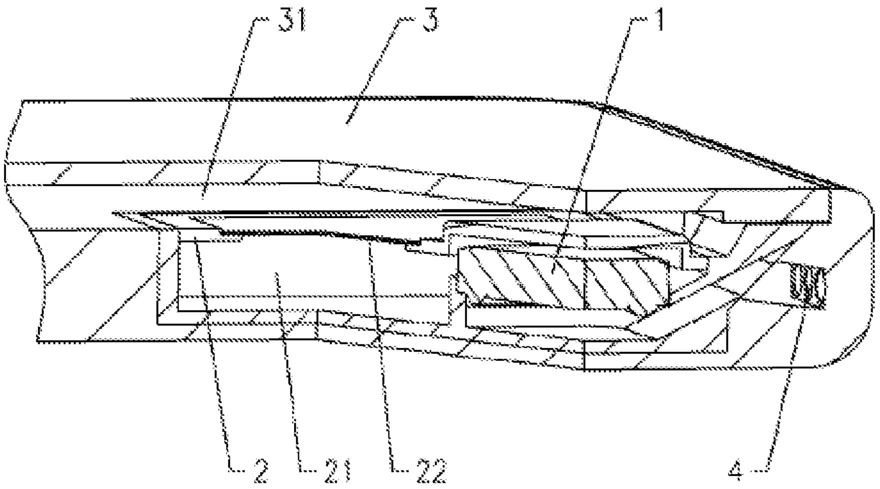
FIG. 12 is a partial enlarged view of FIG. 11.

In this embodiment, further in combination with the structural diagrams of the electronic apparatus shown in FIG. 11 and FIG. 12, the acoustic device is mounted in the electronic apparatus such as a mobile phone, and the electronic apparatus housing is also used as the second housing 3 of the acoustic device. The second closed cavity 31 is formed in a space between the electronic apparatus housing and the internal components and a space between the electronic apparatus housing and the first housing 2 of the acoustic device, which omits the second housing of the acoustic device itself and makes full use of the gap space between the electronic apparatus housing and the components, so as to realize the maximum design of the second closed cavity 31.

Figure 4:
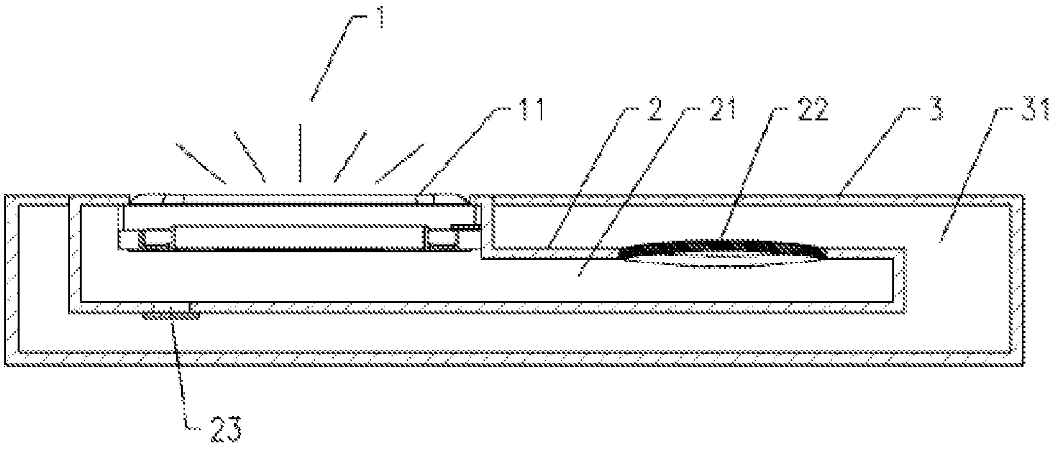
FIG. 4 is a schematic diagram of the operating state of an acoustic device according to an embodiment of the present invention.

As shown in FIG. 4, as the acoustic device is in the operating state, when the vibration diaphragm 11 vibrates downward and compresses the volume at the rear side of the vibration diaphragm 11, the sound pressure will be transmitted to the flexible deformation part 22 through the first closed cavity 21, and the flexible deformation part 22 will expand and deform toward the outside of the first closed cavity 21; on the contrary, when the diaphragm vibrates upward, the flexible deformation part 22 retracts and deforms inwardly to adjust the volume of the first closed cavity 21. Here, the body of the flexible deformation part 22 may be made of plastic material or thermoplastic elastomer material or may be made of silicone rubber material, and the body of the flexible deformation part 22 may have one layer structure or multi-layer composite structure, and the body of the flexible deformation part 22 may have a flat plate shaped structure, or a partially convex or concave structure, for example, a structure with a convex central part or a convex edge part, or a structure with a convex central part and a convex edge part. Furthermore, in order to improve the vibration effect, a composite sheet may be stacked on the central part of the body of the flexible deformation part 22. The strength of the composite sheet is higher than that of the body, and the composite sheet may have a metal structure, plastic structure, carbon fiber structure or composite structure thereof, etc. In addition, the body of the flexible deformation part 22 may have a sheet-like integral structure, or a structure in which the middle is hollow out and a composite sheet is overlapped thereon. In the case that the body of the flexible deformation part 22 which is hollow out in the middle retains only the edge part, the edge part may have a flat plate shape, a convex shape protruding toward one side, or a wavy shape.

In this embodiment, it is preferred that the flexible deformation part 22 is integrally coupled with other parts of the first housing 2. As a specific solution, the flexible deformation part 22 may be manufactured at first, and then the flexible deformation part 22 may be integrally injection-molded into other parts of the housing as an insert member.

In this embodiment, the bodies of the first closed cavity 21 and the second closed cavity 31 extend along the horizontal direction formed by the length and width of the acoustic device, and the horizontal direction may also be defined as a direction perpendicular to the thickness direction of the acoustic device. The horizontal direction generally refers to a direction parallel to the horizontal plane when the acoustic device is placed on the horizontal plane, and the two cavities are provided along the horizontal direction, so as to not occupy the space in the height direction of the acoustic device as much as possible, which is benefit to the thin design of the product.

The second housing 3 has a top wall, a bottom wall and a side wall connecting the top wall and the bottom wall, and the sound outlet 4 of the acoustic device is provided on the top wall, the bottom wall or the side wall. As shown in FIG. 3 and FIG. 4, in this embodiment, the sound outlet 4 is provided on the top wall, and the pressure equalizing hole 23 is provided on the first closed cavity 21.

According to the technical solution of this embodiment, in the acoustic device, the closed cavity at the rear side of the vibration diaphragm 11 is divided into the first closed cavity 21 and the second closed cavity 31 by the partition part, and the partition part is provided with a flexible deformation part 22. By providing the flexible deformation part 22, the flexible deformation part 22 deforms with the sound pressure, so that the volume of the first closed cavity 21 is adjustable, so as to increase the equivalent acoustic compliance of the first closed cavity 21, effectively reduce the resonance frequency of the acoustic device, and improve the low frequency sensitivity; By means of the second closed cavity 31, the sound radiation generated in the deformation process of the flexible deformation part 22 is isolated, and the radiated sound waves of the flexible deformation part 22 is enclosed in the acoustic device, so as to avoid the sound waves with anti-phase radiated by the flexible deformation part 22 to counteract the positive sound waves radiated by the sound generating unit 1, thus greatly improving the sensitivity in the low frequency bands of the product as a whole.

In addition, in the present embodiment, the volume of the second closed cavity 31 is greater than the volume of the first closed cavity 21, which can make the deformation of the flexibly deformation portion 22 become more easier, so that is more benefit to increasing the equivalent acoustic compliance of the first closed cavity 21, effectively reducing the resonance frequency of the acoustic device, and improving the low frequency sensitivity.

In the prior art 1, the compliance of the acoustic device is configured by the compliance parallel connection of the sound generating unit and the closed cavity in the housing, and the formula for fs in the prior art 1 is as follows:

$$f_s = \frac{1}{2*\pi}\sqrt{\frac{C_{as}+C_{ab}}{C_{as}*C_{ab}*M_{ac}}}$$

wherein fs: the resonance frequency of the acoustic device; Cas: the equivalent acoustic compliance of the sound generating unit; Cab: the equivalent acoustic compliance of the air in the box; Mac: the equivalent sound quality of the vibration system of the sound generating unit.

Figure 2:
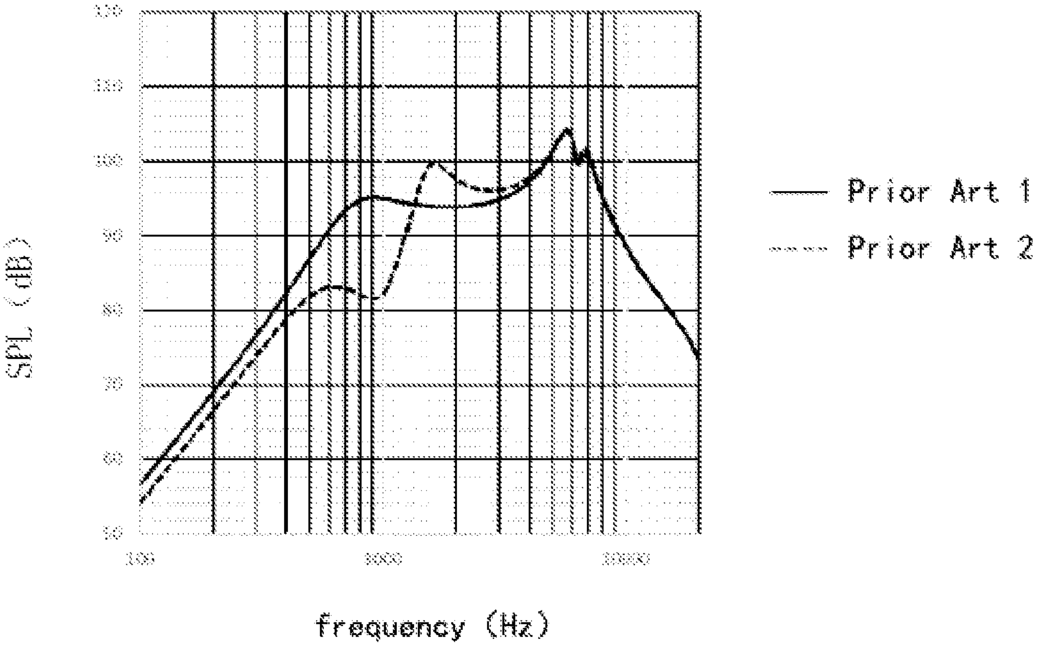
FIG. 2 illustrates the test curves (SPL curves) of loudness at different frequencies for the acoustic device provided with the passive radiator in the prior art 2 and the acoustic device with the traditional structure in the prior art 1.
Figure 5:
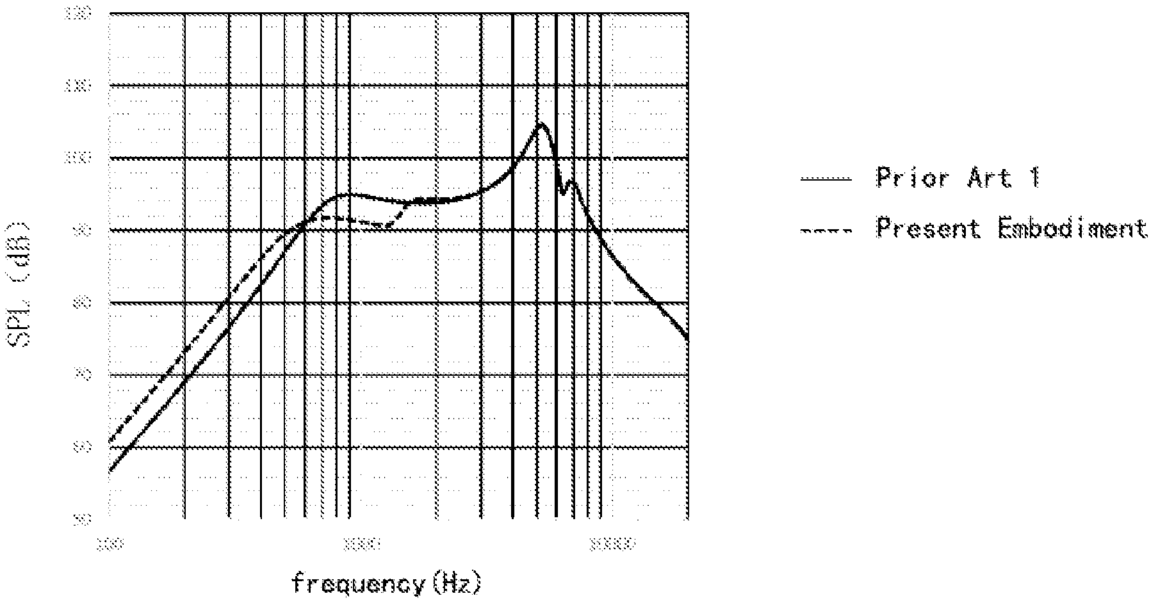
FIG. 5 illustrates the test curves of loudness (SPL curves) at different frequencies for an acoustic device according to an embodiment of the present invention and the acoustic device with the traditional structure in the prior art 1.

In the prior art 2 and this embodiment, in combination with FIG. 2 and FIG. 5, FIG. 2 illustrates the test curves (SPL curves) of loudness at different frequencies for the acoustic device provided with the passive radiator in the prior art 2 and the acoustic device with the traditional structure in the prior art 1, and FIG. 5 illustrates the test curves (SPL curves) of loudness at different frequencies for the acoustic device according to this embodiment and the acoustic device in the prior art 1. The sound generating unit is further connected in parallel with the compliance of a passive radiator/flexible deformation part 22, as a result, the final equivalent compliance increases, so that FO decreases. The formula for fs in the prior art 2 and this embodiment is as follows:

$$f_s = \frac{1}{2*\pi}\sqrt{\frac{C_{as}+C_{ab}+C_{ap}}{C_{as}*C_{ab}*C_{ap}*M_{ac}}}$$

wherein fs: the resonance frequency of the acoustic device; Cas: the equivalent acoustic compliance of the sound generating unit; Cab: the equivalent acoustic compliance of the air in the first closed cavity; Mac: the equivalent sound quality of the vibration system of the sound generating unit; Cap: the equivalent acoustic compliance of the passive radiator/flexible deformation part.

Moreover, in the prior art 2, the sound generating unit and the passive radiator radiate sound to the outside simultaneously, and the sound waves of the sound generating unit and the passive radiator have the phases opposite to each other at the frequency below the resonance point fp, and the sound pressure thereof counteract each other, therefore, the passive radiator has a negative effect on the sensitivity of the acoustic system.

Figure 6:
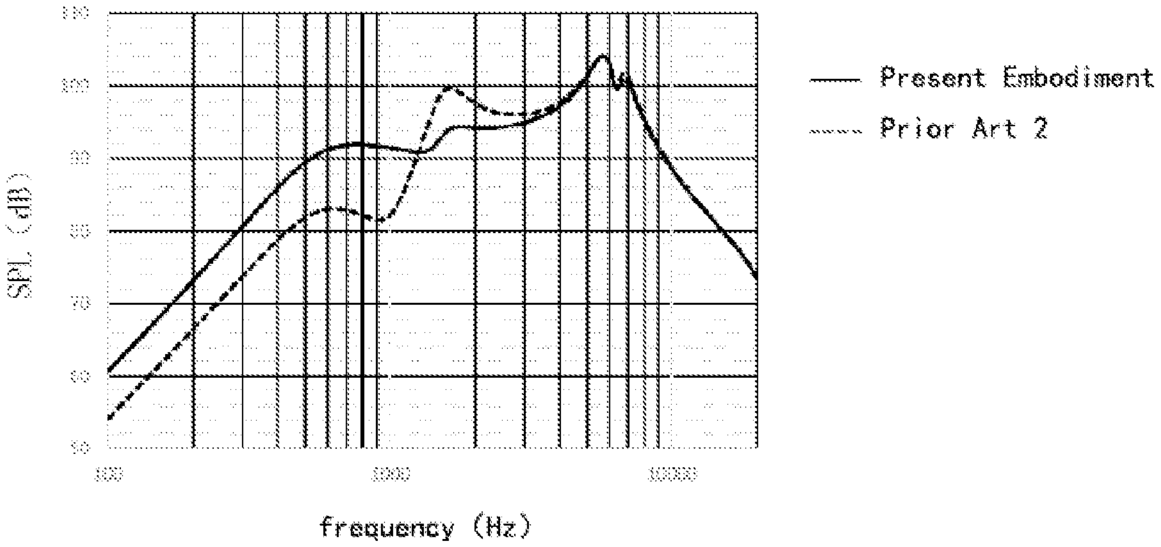
FIG. 6 illustrates the test curves (SPL curves) of loudness at different frequencies for an acoustic device according to an embodiment of the present invention and the acoustic device provided with the passive radiator in the prior art 2.

Furthermore, in this embodiment, in combination with FIG. 6, FIG. 6 illustrates the test curves (SPL curves) of loudness at different frequencies for the acoustic device according to this embodiment and the acoustic device provided with the passive radiator in the prior art 2. By providing the enclosed second closed cavity 31, the second closed cavity 31 retains the sound waves generated at the rear side of the vibration diaphragm of the acoustic device in the interior of the acoustic device. Specifically, the sound pressure generated by the flexible deformation part 22 is isolated by the second closed cavity 31, so as to avoid the sound waves with anti-phase generated by the deformation of the flexible deformation part 22 to counteract the positive sound waves radiated by the sound generating unit, thus greatly improving the sensitivity in the low frequency bands of the product as a whole.

Embodiment 2

Figure 7:
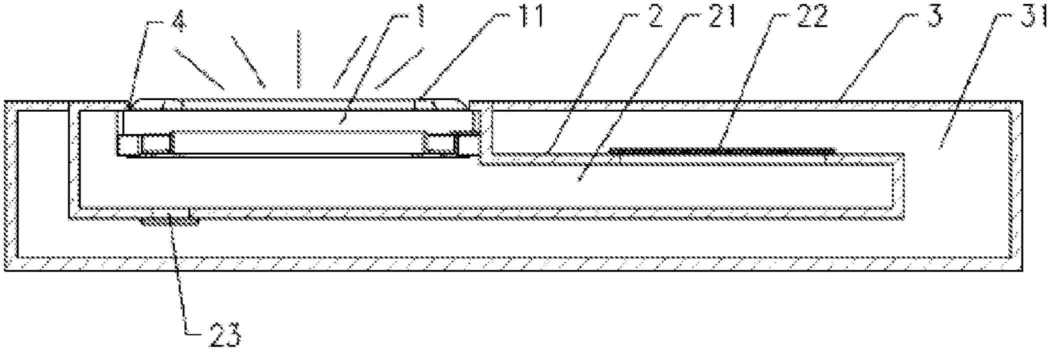
FIG. 7 is a structural schematic diagram of an acoustic device according to another embodiment of the present invention.

As shown in FIG. 7, the main difference between this embodiment and the embodiment 1 is that the flexible deformation part 22 in this embodiment is an independent mounting part, and a through-hole is provided on an isolation part (not shown), and the flexible deformation part 22 is mounted on the through-hole. Specifically, the flexible deformation part 22 is fixedly connected with the portion of the first housing around the through-hole by means of bonding, welding or hot melting. Such an improved design is more convenient in the material selection of the flexible deformation part 22, and can realize a more practical combination with the first housing. Meanwhile, providing the through-hole on the first housing may simplify the product process.

Embodiment 3

The main difference between this embodiment and the above embodiments is that the acoustic device in this embodiment is provided with a sound channel, and the sound channel is designed to correspond to the sound outlet 4, and the sound waves at the front side of the vibration diaphragm 11 radiates to the sound outlet 4 through the sound channel. This design furthermore meets the design requirements for some terminal products, may not occupy the space of the panels such as mobile phone, is benefit to the design of full screen, and can avoid the blocking and interfering from other components.

Figure 8:
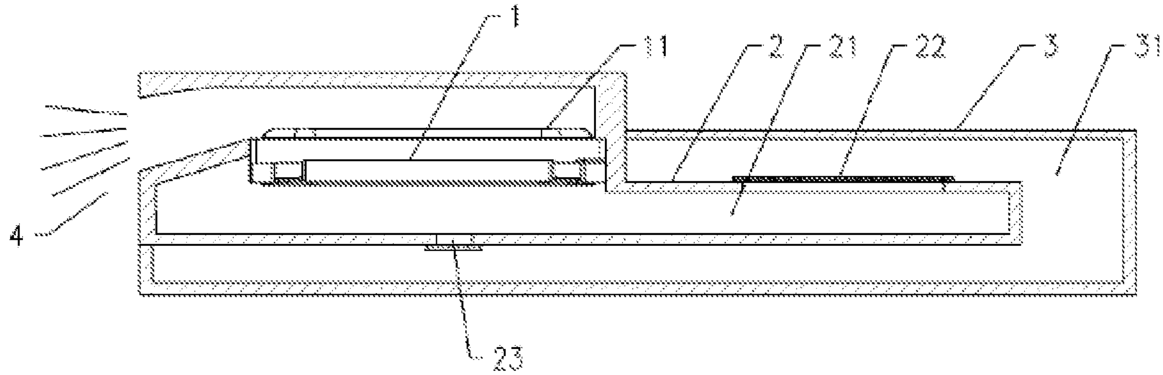
FIG. 8 is a structural schematic diagram of an acoustic device according to still another embodiment of the present invention.

Specifically, as shown in FIG. 8, the sound generating unit 1 is mounted in the first housing 2, and the sound channel is also provided on the first housing 2. In other embodiments, the sound channel may be provided on the second housing 3, and the sound generating assembly may be opposed to and coupled with the sound channel; or the sound channel may be provided separately, and the sound channel may be opposed to and coupled with the sound outlet 4 and the sound generating assembly respectively.

Embodiment 4

Figure 9:
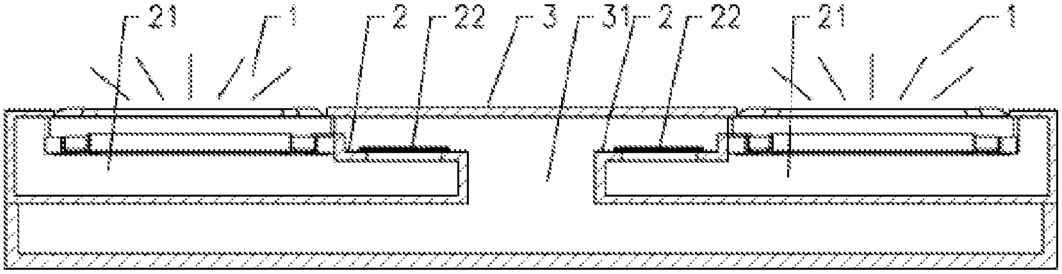
FIG. 9 is a structural schematic diagram of an acoustic device according to yet another embodiment of the present invention.

The main difference between this embodiment and the above embodiments is in that, in this embodiment, the sound generating unit 1 and the first closed cavity 21 are provided in plural by one-to-one correspondence relationship, and the second closed cavity 31 is provided with one, and the partition part between each of the first closed cavities 21 and the common one second closed cavity 31 is provided with a flexible deformation part. Specifically, as shown in FIG. 9, the acoustic device in this embodiment comprises two sound generating units 1, and two first closed cavities 21 are provided to correspond to the two sound generating units 1 respectively, and one second closed cavity 31 is provided, and the partition part is provided between each of the two first closed cavities 21 and the second closed cavity 32, and each partition part is provided with a flexible deformation part 22. This configuration can facilitate the application when the acoustic device or the acoustic system requires a plurality of sound generating units 1, for example, the stereo or array design requirements. The first closed cavities may also provide with other numbers and form a closed cavity together with the one second closed cavity.

Figure 10:
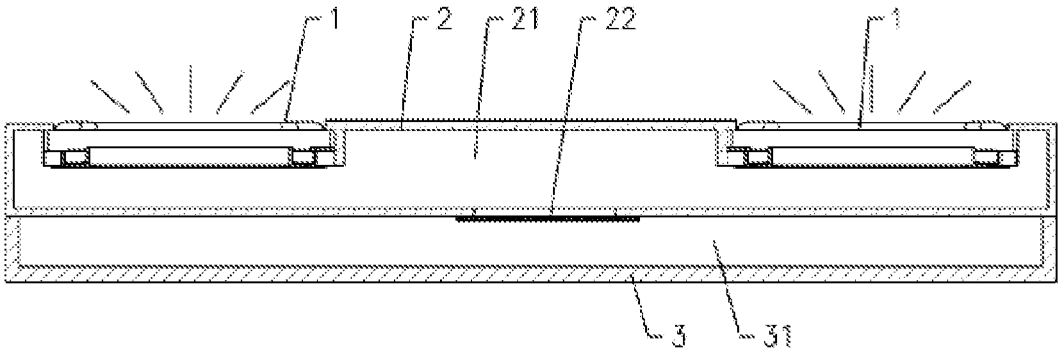
FIG. 10 is a further improvement of FIG. 9.

As a further improvement of this embodiment, as shown in FIG. 10, a plurality of sound generating units 1 are provided, and the plurality of sound generating units correspond to the same first closed cavity 21. Specifically, in this embodiment, two sound generating units 1 are provided, and one second closed cavity 31 is provided, and a flexible deformation part 22 is provided between the first closed cavity 21 and the second closed cavity 31; this implementation process may also be further improved, for example, a plurality of second closed cavity 31 may be provided, and one first closed cavity 21 may be provided, all of them can achieve the technical effect of the present invention.

Embodiment 5

This embodiment discloses an electronic apparatus 5. As shown in FIG. 11 and FIG. 12, the acoustic device in the above embodiments is mounted on the electronic apparatus 5. The electronic apparatus 5 may be a mobile phone, a tablet computer, a notebook, etc.

The electronic apparatus 5 specifically comprises an electronic apparatus housing, and at least a portion of the electronic apparatus housing is used to form the first closed cavity 21 and/or the second closed cavity 31 of the acoustic device. That is, a portion of the wall or the entire wall of the first closed cavity 21 is composed of the electronic apparatus housing, or a portion of the wall or the entire wall of the second closed cavity 31 is composed of the electronic apparatus housing, or a portion of the walls or all of the walls of the first closed cavity 21 and the second closed cavity 31 is composed of the electronic apparatus housing. In the present invention, the electronic apparatus housing is also used as the walls of the first closed cavity 21 and/or the second closed cavity 31, which can make full use of the internal space of the electronic apparatus and meanwhile save a part of the space occupied by the wall of the cavity, which is more benefit to the thin design of the electronic apparatus.

In this specific embodiment, the acoustic device comprises a first housing 2, and the sound generating unit 1 is mounted on the first housing 2 to form a sound generating assembly, and the first closed cavity 21 is formed between the vibration diaphragm 11 of the sound generating unit 1 and the first housing 2, wherein the partition part is a portion of the first housing 2, and the flexible deformation part 22 is provided on the partition part; the acoustic device further comprises a second housing 3, and the sound generating assembly is mounted in the second housing 3, and the second closed cavity 31 is formed between the second housing 3 and the first housing 1. Here, the second housing 3 is the electronic apparatus housing. In fact, the space between the electronic apparatus housing and the internal parts thereof and the space between the electronic apparatus housing and the first housing 2 of the acoustic device forms the second closed cavity 31. The electronic apparatus housing is used as the second housing 3 of the acoustic device, so that the second housing of the acoustic device itself may be omitted, and the gap space between the electronic apparatus housing and the components is sufficiently utilized, thus realizing the maximum design of the second closed cavity 31, which is benefit to the thin design of electronic apparatus.

Although some specific embodiments of the present invention have been described in detail by examples, it should be understood by those skilled in the art that the above examples are for illustrative purposes only and are not intended to limit the scope of the present invention. It should be understood by those skilled in the art that the above embodiments may be modified without departing from the scope and spirit of the present invention. The scope of the present invention is defined by the appended claims.

What is claimed is:

1. An acoustic device, comprising:

a sound generating unit comprising a vibration diaphragm, wherein the acoustic device is provided with a sound outlet, and sound waves at a front side of the vibration diaphragm radiates to outside through the sound outlet; and an enclosed closed cavity formed at a rear side of the vibration diaphragm, and the closed cavity is divided into a first closed cavity and a second closed cavity by a partition part, wherein at least a portion of the partition part can be flexibly deformed, and the first closed cavity is adjacent to the vibration diaphragm, and the second closed cavity is far away from the vibration diaphragm, and a volume of the second closed cavity is larger than a volume of the first closed cavity, when the vibration diaphragm vibrates, an internal sound pressure of the first closed cavity changes, so a flexible deformation part of the partition part deforms with the change of the sound pressure in the first closed cavity, so as to flexibly adjust the volume of the first closed cavity; and the second closed cavity encloses sound waves generated by the flexible deformation part during the deformation into the second closed cavity, and at least a part of an electronic apparatus housing for mounting the acoustic device is used for forming the first closed cavity and/or the second closed cavity, wherein the acoustic device comprises a first housing, the sound generating unit is mounted on the first housing to form a sound generating assembly, and the first closed cavity is formed between the vibration diaphragm of the sound generating unit and the first housing, wherein the acoustic device comprises a second housing, the sound generating assembly is mounted in the second housing, and the second closed cavity is formed between the second housing and the first housing, wherein a portion of the first housing forms the partition part, wherein the second housing is the electronic apparatus housing, and wherein the sound generating unit and the flexible deformation part are arranged on the same side of the first housing and are arranged in a staggered manner.

2. The acoustic device of claim 1, wherein bodies of the first closed cavity and the second closed cavity extend in a horizontal direction perpendicular to a thickness direction of the acoustic device.

3. The acoustic device of claim 1, wherein the sound generating units and the first closed cavities are provided in plural by one-to-one correspondence, the second closed cavity is provided with one, and the partition part between each of the first closed cavities and the second closed cavity is provided with the flexible deformation part.

4. The acoustic device of claim 1, wherein the sound generating unit is provided with one or more, the first closed cavity is provided with one, and the second closed cavity is provided with one or more.

5. The acoustic device of claim 1, wherein a vibration direction of the vibration diaphragm of the sound generating unit is parallel to a thickness direction of the acoustic device.

6. The acoustic device of claim 1, wherein the second housing has a top wall, a bottom wall and a side wall connecting the top wall and the bottom wall, and the sound outlet is provided on the top wall, the bottom wall or the side wall.

7. The acoustic device of claim 6, wherein the acoustic device is provided with a sound channel corresponding to the sound outlet, and the sound waves at the front side of the vibration diaphragm radiates to the sound outlet through the sound channel, wherein the sound generating unit is mounted in the first housing, and the sound channel is provided on the first housing; or the sound channel is provided on the second housing, and the sound generating assembly is opposed to and coupled with the sound channel; or the sound channel is separately provided, and the sound channel is opposed to and coupled with the sound outlet and the sound generating assembly, respectively.

8. The acoustic device of claim 1, wherein the flexible deformation part is an independent part, and the flexible deformation part is fixedly connected with other portions of the first housing by means of bonding, welding or hot melting; or the flexible deformation part is integrally coupled with the other portions of the first housing.

9. The acoustic device of claim 1, wherein the sound generating unit is a micro sound generating unit.

10. An electronic apparatus, comprising the acoustic device according to claim 1.

11. The electronic apparatus of claim 10, the electronic apparatus comprises an electronic apparatus housing, and at least a portion of the electronic apparatus housing is used for forming the first closed cavity and/or the second closed cavity.

12. The electronic apparatus of claim 11, wherein the acoustic device comprises a first housing, the sound generating unit is mounted on the first housing to form a sound generating assembly, and the first closed cavity is formed between the vibration diaphragm of the sound generating unit and the first housing; the acoustic device further comprises a second housing, the sound generating assembly is mounted in the second housing, and the second closed cavity is formed between the second housing and the first housing, a portion of the first housing forms the partition part, and the second housing is the electronic apparatus housing.

* * * * *